March 17. 1925.  1,529,942
D. H. BRADLEY
DIFFERENTIAL TRANSMISSION
Filed March 16, 1922   2 Sheets-Sheet 1
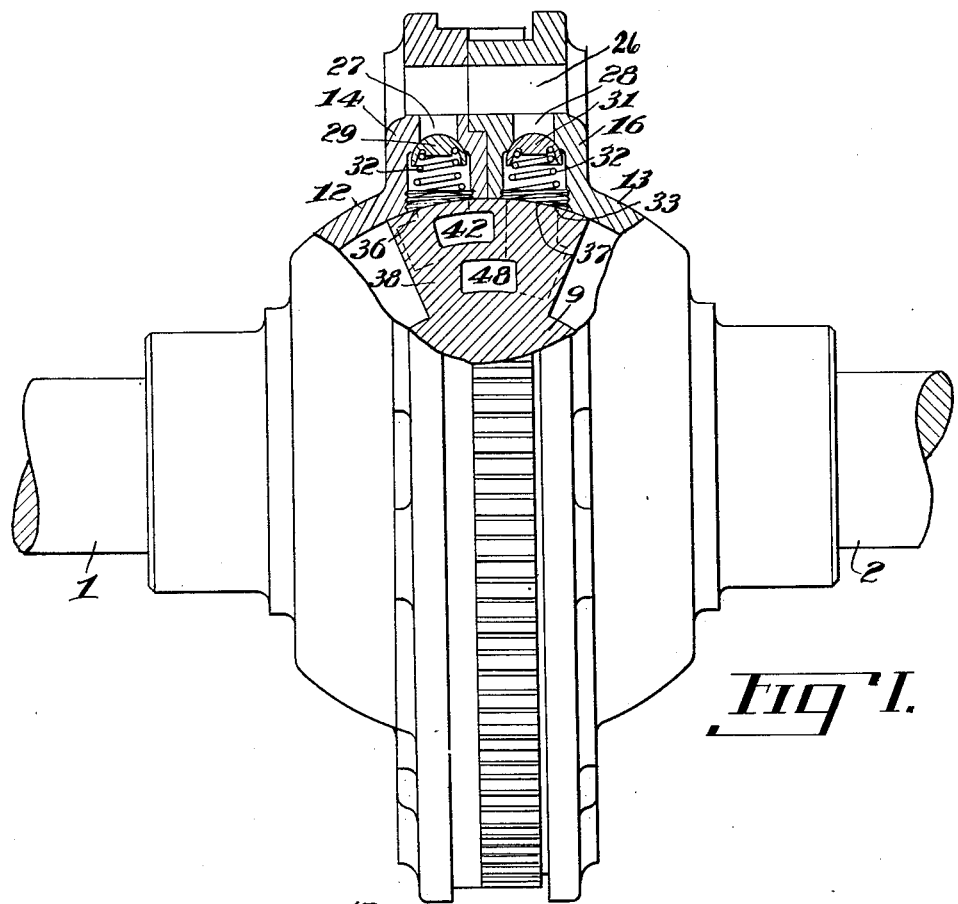
Fig'I.
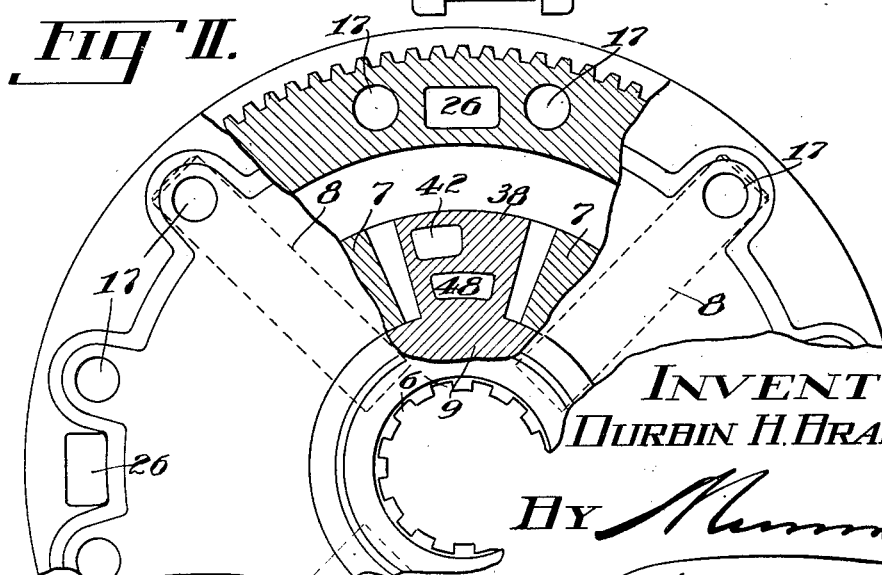
Fig'II.
INVENTOR
DURBIN H. BRADLEY.
By
ATTORNEYS

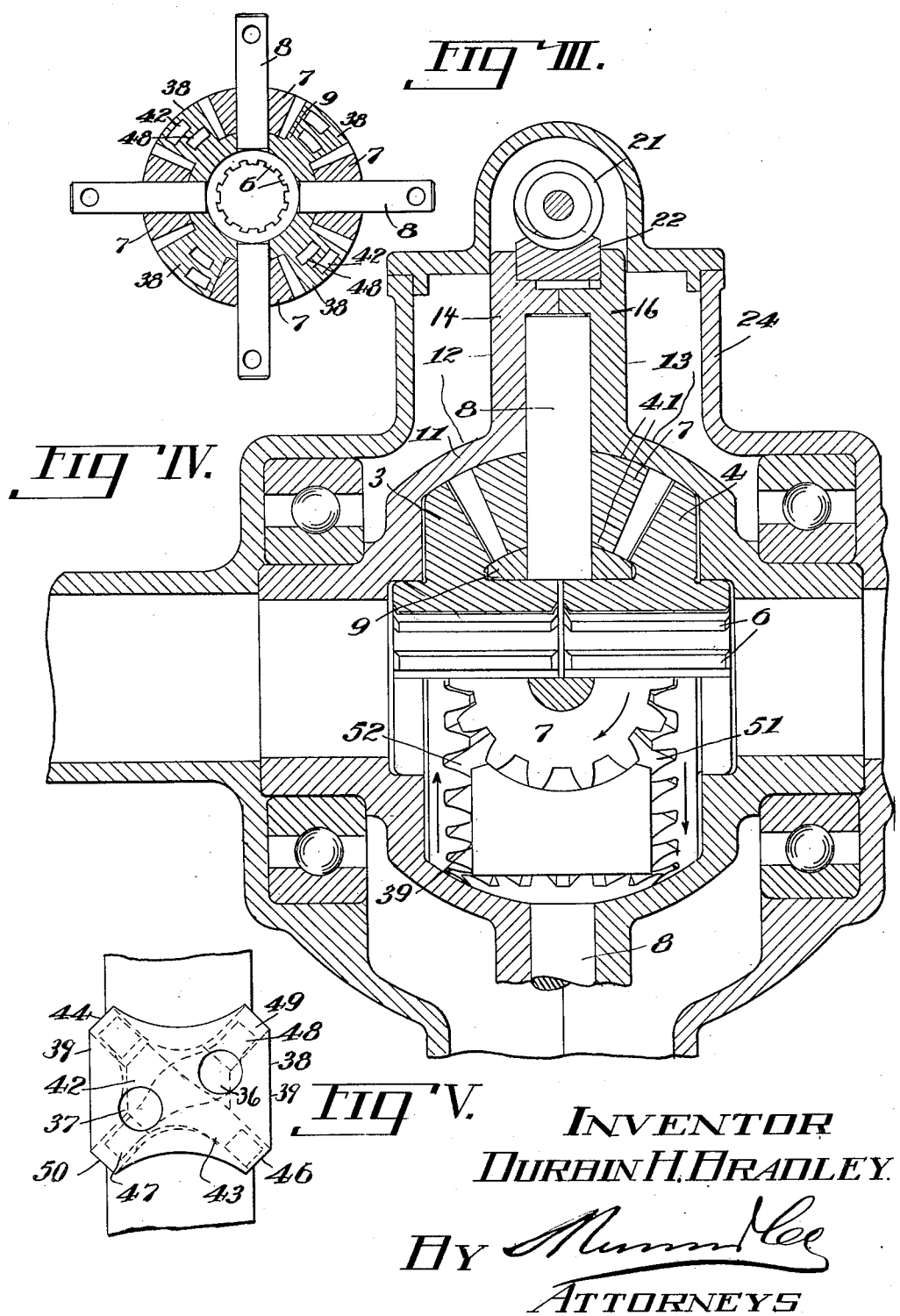

Patented Mar. 17, 1925.

1,529,942

UNITED STATES PATENT OFFICE.

DURBIN H. BRADLEY, OF SUNNYVALE, CALIFORNIA.

DIFFERENTIAL TRANSMISSION.

Application filed March 16, 1922. Serial No. 544,303.

*To all whom it may concern:*

Be it known that I, DURBIN H. BRADLEY, a citizen of the United States, and a resident of Sunnyvale, county of Santa Clara, and State of California, have invented a new and useful Differential Transmission, of which the following is a specification.

The present invention relates to improvements in differential gears and has particular reference to locking means for the same. It is a well-known fact that in motor vehicles power is transmitted from the engine to the rear wheels through a differential gearing which normally rotates both of the wheels or their respective shafts at the same speed, but which allows one of the wheels to rotate faster than the other when the load on the latter is increased, the object being to allow one of the wheels to rotate at increased speed relative to the other in turning around a corner. While this is the object of the differential mechanism, it is desired that the differential movement of the two wheels relative to each other should be confined within certain limits since an ordinary arrangement of the character described will allow one wheel to spin while the other is standing still, which is undesirable because it makes it impossible to apply any power to the latter wheel while the former is spinning. If, for instance, one of the wheels of an automobile has sunk into a mud hole, any power that may be applied to the rear wheels from the engine will waste itself in spinning the wheel that is in the mud hole while leaving the other wheel which might pull the machine out of the mud hole unaffected.

It is the object of the present invention to overcome this undesirable feature by providing a differential gear which although allowing of a certain freedom of differential motion between the two wheels will limit the same so that spinning of one wheel while the other stands still will be avoided. It is a further object of this invention to render the differential gear self-locking irrespective of the direction of rotation of one wheel relative to the other. It is a further object of the invention to provide a gradual engagement of the locking feature whereby sudden shocks are avoided. A further object is to provide an efficient lubrication means in combination with my device by the use of a liquid lubricant as one of the working elements of my locking arrangement.

With these objects in view, I have illustrated the preferred form of my invention in the accompanying drawings, in which Figure 1 shows a rear view of my differential, partly shown in section; Figure 2 a side view of the same, partly in section; Figure 3 a longitudinal cross section; through the principal working mechanism; Figure 4 a transverse cross section through the same, and Figure 5 a detail view of a portion of a filling element looking at the same in radial direction. While only one form of the invention is shown in the drawings, it should be understood that various changes or modifications may be made within the scope of the claims hereto attached without departing from the spirit of the invention.

Referring to the drawings in detail my differential comprises two axially alined transverse shafts (1) and (2) operatively connected with the driving wheels (not shown) of a motor vehicle and adapted to be rotated by means of two oppositely arranged bevel gears (3) and (4) engaging the same through the splines or keys (6). The bevel gears are actuated by means of a plurality of pinions (7) rotatable on shafts (8) disposed in radial relation to the axis of the shafts (1) and (2) and supported internally in a ring (9), hereinafter referred to as the filling ring, and externally in the cage (11) which encloses the whole mechanism thus far described. This cage is preferably made of two halves (12) and (13) provided with suitable flanges (14) and (16) secured together by means of suitable bolts passing through registering perforations (17). The cage may be rotated by any suitable means from the engine as, for instance, by a worm (21) driving a worm gear (22) provided on the outside of the cage. The latter as a whole is surrounded by a housing (24) which is kept filled with a proper lubricant to a certain level so that the cage when rotating continuously dips into the lubricant and is partly submersed in the same.

The flanges (14) and (16) are provided with transverse apertures (26) with which communicate radial passages (27) and (28) leading to the interior of the cage and controlled by valves (29) and (31) which allow of the intake of oil through the same provided sufficient power is brought to bear to overcome the resistance of the springs (32) seating the valves. The tension of the latter may be adjusted by any suitable means as by externally threaded rings (33).

These apertures and valves are preferably arranged symmetrically in the flanges midway between the points where the radial shafts (8) engage the same so that the internal ends of the passages (27) and (28) register with two ports (36) and (37) within the arms (38) extending radially from the filler ring (9). The latter serves to substantially fill all the unoccupied space within the cage and its general shape is shown in Figure 3, while the particular construction of each arm appears from Figure 5. The arms present curved sides (39) to the two gear wheels (4) so that the points of the teeth of the latter are in sliding contact with the same, and they present a curved surface to the pinions so as to also make a sliding contact with the points of their teeth. Particular attention is called to the fact that the pinions themselves have spherical outlines at their ends as shown at (41) so as to fit closely to the ring (9) as well as to the wall of the cage (11).

As previously stated, the passages (27) and (28) register with the ports (36) and (37) in each arm (38). As will be seen from Figure 5 the port (37), after penetrating the arm (38) in radial direction to a certain depth, divides itself into two branches (42) and (43) landing at two diametrically opposed edges (44) and (46) of the arm. The port (36) extends to a depth different from that of port (37) so as not to collide with the same, and then divides itself into the two branches (47) and (48) landing in the two other diametrically opposed edges (49) and (50) of the arm.

In operation it will be understood from the preceding description that the cage (4) receives rotary motion from the engine through the worm (21) and the worm gear (22) and is thereby caused to rotate within the housing (24), which latter is partly filled with a lubricant so that a portion of the rotating cage is always immersed in the same. The radial shafts (8) are rotated with the cage and engage through their pinions (7) the two gear wheels (3) and (4) so that the latter normally rotate at the same speed, thereby actuating the drive wheels. If one of the drive wheels is subjected to a larger load than the other one it will have a tendency to slow down, causing the other to rotate correspondingly faster. Ordinarily this result is desired when turning around a corner, and my improvement is not intended to interfere with this process. But if a situation should arise that would force one of the wheels to spin rapidly while leaving the other unaffected altogether due to the fact, for instance, that one of the wheels is in a mud hole, then my improvement would become effective in the following manner:

The situation outlined would cause a differential movement of the two gear wheels (3) and (4) relative to each other, and we will assume that they rotate in the direction of the arrows, that is, looking at it from the left (Figure 4), the gear wheel (3) would move counter-clockwise while the gear (4) would move clockwise, the pinion (7) rotating in the direction of its arrow. Remembering that the filler fills all the space left unoccupied by the gear wheels and the pinions and makes a sliding contact with the various teeth engaging the same, it will be readily understood that the different gear and pinion teeth cooperate with the filler in the same manner as the rotor of a rotary pump co-operates with the stator. A pumping action will, therefore, result which causes a vacuum or a partial vacuum wherever the teeth of the gear wheels and the pinions part from each other, as at (51), Figure 4, and a pressure where these teeth engage each other, as at (52). Thus there will be created along two diametrically opposed edges of each arm a vacuum, while along the other two diametrically opposed edges of each arm there will be a pressure. Assuming that a vacuum is created along the two edges (44) and (46) of Figure 5, and a pressure along the edges (49) and (50), oil will be drawn from the housing, through the port (37), the two branches (42) and (43) toward the edges (44) and (46) into the vacuum at (51), and will be forced toward the edges (49) and (50) through the branches (47) and (48) into the port (36). The oil would thus be circulated from the housing through one port in the arm and its branches, into the cage, through the other port and its branches back into the housing if it were not for the two valves (29) and (31) which allow of the entrance of the oil into the cage, but do not allow the oil to leave the cage. We thus meet with a condition where the discharge of a pump is closed, which naturally would stop the pump. Since in our case the differential motion of the gear wheels constitutes the pump, the closing of the discharge will naturally stop the differential motion of the two gear wheels, which means that after sufficient oil has been pumped into the discharge by the differential action of the two gear wheels, this action must stop since no further space is available for the oil that would be pumped on a continuation of the differential motion. In other words, differential motion would be allowed to continue for a certain length of time, such as would be necessary for turning a corner, but would be automatically stopped if such length of time would extend beyond a desired degree whereby spinning of one wheel would be prevented. It will be observed that this locking action would make itself felt gradually so that the mechanism would not be exposed to any sudden shocks.

My mechanism works both ways since it is symmetrically arranged all the way through. If, for instance, in Figure 4 the direction of rotation of the two wheels (3) and (4) were reversed, suction would be created at (52) and pressure at (51) and oil would be drawn into the cage through the port (38) and its branches (47) and (48), while the discharge would be through the port (37) and its branches (42) and (43) to be stopped in due time by the valve controlling this passage.

The locking action will not be positive, because of inherent or purposely made leakage around gear teeth and face of gears, but will be of a nature that the degree of locking will be dependent on the relative speed of the two axles and the pressure created by the pumping action. The more or less prompt relief of this pressure will be continually effected by said leakage.

I claim:

1. In a differential gear consisting of two co-axial opposing gear wheels and interposed revolving pinions for actuating the same, filling means co-operating with the gear and pinion teeth for causing pumping action when the gear wheels move at different speeds, said filling means having two sets of passages therein for allowing the pumping action to draw on an outside source through either set, according to the direction of the relative rotation of the gear wheels, and intake valves associated with each set for closing the one not drawn on.

2. Retarding means for a differential transmission including a housing, a lubricant therein, a cage rotatable in the housing and a differential gear transmission within the cage having means co-operating with its gears for pumping lubricant into the cage from the housing on a differential action of the gears, whereby the latter action is retarded after a certain amount of lubricant has been pumped.

3. Filling means for a differential gear consisting of two opposing co-axial gear wheels and a plurality of pinions mounted on radial shafts between the same, comprising a filler adapted to occupy the space left vacant by the pinions and two sets of passages therein allowing the pumping action of a differential motion to draw on a lubricant in a surrounding housing through either set according to the direction of the relative rotation of the sets.

4. Filling means for a differential gear consisting of two opposing co-axial gear wheels and a plurality of pinions mounted on radial shafts between the same, comprising a filler adapted to occupy the space left vacant by the pinions and two sets of passages therein allowing the pumping action of differential motion to draw on a lubricant in a surrounding housing through either set according to the direction of the relative rotation of the sets, and intake valves associated with each set for closing the one not drawn on.

5. In a device of the character described, two alined shafts, a cage rotatable on the adjacent ends thereof having means for rotating the same associated therewith, opposing bevel gears keyed to the shafts within the cage, a ring rotatably mounted between the bevel gears having radial pins extending therefrom into the cage wall, a pinion on each pin meshing with the bevel gears, filler arms extending from the ring made to fill the space between each two pinions and the bevel gears having passages therein establishing communication between diametrically opposed edges of the arms and ports in the cage wall for producing pumping action when the bevel gears move differentially and intake valves in the ports adapted to block the discharge for arresting differential motion of the bevel gears.

6. In a device of the character described, two alined shafts, a cage rotatable on the adjacent ends thereof having means for rotating the same associated therewith, opposing bevel gears keyed to the shafts within the cage, having flanges extending toward one another, a ring rotatable on the flanges having radial pins extending therefrom into the cage wall, a pinion on each pin meshing with the bevel gears, filler arms extending from the ring made to fill the space between each two pinions and the bevel gears having passages therein establishing communication between diametrically opposed edges of the arms and ports in the cage wall for producing pumping action when the bevel gears move differentially and intake valves in the ports adapted to block the discharge for arresting differential motion of the bevel gears.

DURBIN H. BRADLEY.